United States Patent [19]

Hutton et al.

[11] Patent Number: 5,143,954
[45] Date of Patent: Sep. 1, 1992

[54] LOW-FORMALDEHYDE, SELF-CROSSLINKING POLYMER LATEX COMPOSITION

[75] Inventors: Thomas W. Hutton, Doylestown; Ronald W. Novak, Chalfont, both of Pa.

[73] Assignee: Rohm and Haas Company, Philadelphia, Pa.

[21] Appl. No.: 618,759

[22] Filed: Nov. 27, 1990

[51] Int. Cl.$^5$ .......................... C08K 5/34; C08K 5/16; C08K 5/11; C08K 5/10
[52] U.S. Cl. .................... 524/106; 524/206; 524/209; 524/247; 524/314; 524/317; 524/558
[58] Field of Search ............... 524/106, 314, 317, 206, 524/209, 247, 558

[56] References Cited

U.S. PATENT DOCUMENTS

| | | | |
|---|---|---|---|
| 3,580,876 | 5/1971 | Stone et al. | 524/317 |
| 3,590,100 | 6/1971 | Weiland | 524/598 |
| 4,323,624 | 4/1982 | Hunsucker et al. | 428/270 |
| 4,472,165 | 9/1984 | Gregorian et al. | 8/115.7 |
| 4,473,678 | 9/1984 | Fink et al. | 524/211 |
| 4,524,093 | 6/1985 | Devry | 524/512 |
| 4,525,492 | 6/1985 | Rastall et al. | 521/181 |
| 4,670,184 | 6/1987 | Bjorlin et al. | 252/311 |
| 4,735,851 | 4/1988 | Dodson et al. | 428/326 |

FOREIGN PATENT DOCUMENTS

| | | | |
|---|---|---|---|
| 31608/84 | 2/1985 | Australia . | |
| 0302289 | 2/1989 | European Pat. Off. . | |
| 3902067 | 7/1990 | Fed. Rep. of Germany . | |
| 2575754 | 7/1986 | France . | |
| 0426745 | 4/1935 | United Kingdom | 524/314 |
| 2086929 | 5/1982 | United Kingdom | 524/106 |
| 2137218 | 10/1984 | United Kingdom | 524/106 |

*Primary Examiner*—Paul R. Michl
*Assistant Examiner*—Peter Szekely
*Attorney, Agent, or Firm*—Ronald D. Bakule

[57] ABSTRACT

A low-formaldehyde polymer latex composition includes a formaldehyde-scavenging agent selected from
a) a compound having the formula

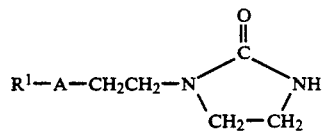

wherein A is selected from O, NH, and $NR^2$; $R^1$ is selected from H, 3-allyloxy-2-hydroxypropyl, methacryloyl, acryloyl and methacryloxyaceto; and $R^2$ is 3-allyloxy-2-hydroxypropyl when $R'$ is 3-allyloxy-2-hydroxypropyl;

b) a compound having the formula $R^3CH_2R^4$, wherein
  $R^3$ and $R^4$ are both $-C(O)OR^5$;
  $R^3$ is $CH_3C(O)-$ and $R^4$ is $-C(O)OR^5$;
  $R^3$ is $-CN$ and $R^4$ is selected from $-C(O)NH_2$ and $-C(O)OR^5$; or
  $R^3$ is $CH_3C(O)-$ and $R^4$ is $-C(O)OCH_2CH_2OC(O)C(CH_3)=CH_2$; and
  $R^5$ is a $C_1-C_6$ hydrocarbon radical;

c) a compound having the formula

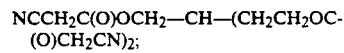

d) hydroxylamine;

e) salts of hydroxylamine with an acid, the acid having an acid dissociation constant the negative logarithm of which is no greater than about 5.0; and f) the polymerized residue of a compound having the formula

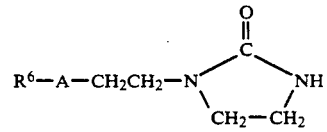

wherein A is selected from O, NH, and $NR^2$; $R^6$ is selected from 3-allyloxy-2-hydroxypropyl, methacryloyl, acryloyl or methacryloxyaceto; and $R^2$ is 3-allyloxy-2-hydroxypropyl when $R'$ is 3-allyloxy-2-hydroxypropyl; and g) the polymerized residue of a compound having the formula

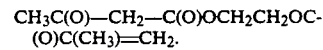

The composition can also include a self-crosslinking polymer latex having N-methylol functional groups, such as from polymerized residues of N-methylolacrylamide or N-methylolmethacrylamide. In this case, the composition may be of use as a binder for textiles or non-woven materials. The scavenging agent reduces formaldehyde evolution during drying and curing of these compositions.

10 Claims, No Drawings

LOW-FORMALDEHYDE, SELF-CROSSLINKING POLYMER LATEX COMPOSITION

BACKGROUND OF THE INVENTION

1. Field of the Invention

This invention relates generally to aqueous polymer latex compositions, and more specifically to polymer latex compositions including residual formaldedhyde, such as self-crosslinking polymer latex compositions including polymers having N-methylol functionality for crosslinking,

2. Brief Description of the Prior Art

Formaldehyde is an undesired by-product present in some polymer latex compositions For example, formaldehyde may be generated from sodium formaldehyde sulfoxylate, a reducing agent used in some redox polymerization systems In addition, formaldehyde is sometimes generated in curing of self-crosslinking polymer latex compositions.

Self-crosslinking aqueous polymer latex compositions are known for a number of different applications. Self-crosslinking polymers can be crosslinked without an additional chemical crosslinking agent. Frequently, an end-use composition is prepared including the self-crosslinking aqueous polymer latex as a binder, and the composition is subsequently crosslinked into a three-dimensional coating or article, as by application of heat. The use of a self-crosslinking polymer latex simplifies the preparation of the end-use composition by reducing the number of components, eliminating the need to mix a separate catalyst or crosslinking agent immediately before use, although a catalyst may be premixed in the composition In addition, the use of a self-crosslinking polymer may permit the preparation of a preformed, incompletely cured article or stock material, which can be subjected to additional processing steps before cure, adding flexibility to the manufacturing process Use of a self-crosslinking polymer latex may reduce the likelihood that an undesirable monomeric catalyst or unreacted crosslinking agent will subsequently leach out of or migrate from the end-use product into its environment.

One type of self-crosslinking aqueous polymer latex includes a N-methylol functional residue. This type of polymer latex is polymerized from a monomer mixture which includes a copolymerizable, ethyenically unsaturated N-methylol-functional monomer, such as N-methylolacrylamide. Polymer latexes prepared using N-methylolacrylamide have been used, for example, as binders for non-woven products, as bases for oil-well drilling fluid compositions, as viscosity modifiers for injection water for enhanced oil recovery, in preparing ion-exchange resins, as chemically modified cellulose for paper, in making shoeboard for shoes, in making synthetic leather, in making photographic paper, in preparing mortar mix, and in preparing baking enamels.

N-methylolacrylamide is typically prepared by reaction in aqueous media of ac with formaldehyde:

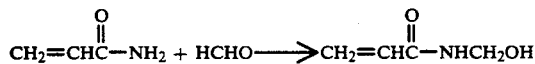

Preparations of N-methylolacrylamide can include excess unreacted acrylamide to reduce the equilibrium formaldehyde level in the preparation. The rate constant for the preparation reaction is pH-dependant, as is the dissociation reaction for the polymerized residue of the N-methylol acryamide. See, e.g., H. A. Pederson, *Handbook of Fiber Science and Technology*, Volume II, Part A (Marcel Dekker, Inc. 1983) pp. 47–327.

Formaldehyde itself is undesirable as a contaminant in many products, and efforts have been made to reduce ambient formaldehyde levels in products such as urea-formaldehyde insulation and in other building products such as chip-board and the like in which urea-formaldehyde-type adhesives are used. Formaldehyde can be generated by dissociation of polymerized N-methylol acrylamide, such as that found in some aqueous polymer latex compositions used to prepare texile finishes and the like, as well as during heating of the end-use composition to prepare a product. Because the evolved free formaldehyde is believed hazardous, it is desirable to minimize its generation in such compositions. Commercial self-crosslinking aqueous polymer latex compositions may include several hundred parts per million or more of formaldehyde from various sources.

A self-crosslinking aqueous polymer latex including the residue of N-methylolacrylamide is a potential source of formaldehyde, and it is strongly desirable to minimize the amount of free formaldehyde generated from the N-methylolacrylamide residue during storage and use of the corresponding self-crosslinking aqueous polymer latex and end-use products which are made using that latex Efforts have been made to reduce formaldehyde emissions from methylolated resins generally. For example, U.S. Pat. No. 4,735,851 discloses treating formaldehyde-containing resin with peroxide to reduce formaldehyde liberation. U.S. Pat. No. 4,670,184 discloses a 4,6-diamino-1,3,5-triazin-2-yl compound as a formaldehyde binding agent in molding resins U.S. Pat. No. 4,525,492 discloses adding urea, melamine or dicyandiamide as a coreactant in phenolic foams to reduce free formaldehyde. U.S. Pat. No. 4,472,165 discloses the use of formaldehyde scavengers, such as urea and ethyleneurea, in the formulation of foams for reducing free formaldehyde in fabrics treated with methylolated resins or dimethylol compounds for imparting wrinkle resistance. U.S. Pat. No. 4,323,624 discloses treating fibers with an aldehyde-based resin, such as a urea-aldehyde resin, and a nitroalkanol to reduce free formaldehyde. European Patent Application 0 302 289 A discloses a process for reducing formaldehyde emissions from acid-hardening lacquers by adding a compound containing an acidic alpha-methylene group and an amide nitrogen, such as cyanoacetamide. Japanese Patent Publication 49/106 588 discloses addition of urea, thiourea or ethyleneurea to urearesins to lower free formaldehyde content French Patent Application 2 575 754 A discloses addition of an alpha-methylated ketone to a formaldehyde-type condensation resin to lower free formaldehyde.

In general, it is desirable that methods of mimimizing the formaldehyde generated avoid undesirable side effects, such as the formation of colored products which detract from the appearance of the end product It is also desirable that no more than low levels of formaldehyde be generated in self-crosslinking methylol-functional polymer latex compositions during storage prior to use. It is also important that otherwise desirable application properties of compositions including self-crosslinking polymer latexes be maintained when such compositions are reformulated to reduce formaldehyde evolution.

Efforts have been made to reduce liberation of formaldehyde upon drying or curing of synthetic polymer films containing residues of N-methylolacrylamide. For example, U.S. Pat. No. 4,473,678 discloses self-crosslinking aqueous dispersions of synthetic resin which contain N-methylolamide groups, but which additionally contain both from 2 to 10 percent by weight of a hydroxyalkyl ester, such as 2-hydroxyalkyl acrylate, in the resin, and urea in the aqueous phase. U.S. Pat. No. 4,524,093 discloses a fabric coating composition with low formaldehyde evolution during curing which includes an aqueous emulsion of alkyl acrylate monomers copolymerized with acrylonitrile, itaconic acid, and N-methylolacrylamide, and containing an imidazolidone curing resin and a metal chloride-type acid catalyst. Similarly, U.S Pat. No. 3,590,100 discloses driving to completion reactions of the type which produce a dimethylol alkyl carbamate for textile finishing by reacting the free formaldehyde coproduct by reaction with added ethylene urea, propylene urea or glyoyxyl and urea. German Offenlegungsschrift 25 38 015 discloses removal of free formaldehyde from microcapsule dispersions by addition of hydroxy, methoxy, ethoxy, methyl or ethyl derivatives of 5- or 6-membered rings derived from urea or of 2-oxo-isoxazolidine.

With respect to aqueous dispersions of polymerized ethylenically unsaturated monomers, Australian Patent Application 31608/84 published 12/24/87 discloses the use of ethylene urea, mono- and dihydroxyethyleneurea and sundry six-member ring compounds including the —NHC(O)NH— radical as a formaldehyde scavenger in aqueous plastics dispersions based on a crosslinkable polymer of ethylenically unsaturated monomers containing N-methylolamide and/or N-methylol etheramide groups.

While progress has been made in reducing formaldehyde evolution during drying and cure of self-crosslinking, methylol-functional polymer latex compositions, there is still a significant need for a self-crosslinking aqueous polymer latex compostion in which only low levels of formaldehyde are generated during extended storage, and evolves low levels of formaldehyde during drying and cure, while retaining important application properties.

SUMMARY OF THE INVENTION

The present invention provides a low-formaldehyde polymer latex composition, the composition includes a polymer latex and at least one formaldehyde-scavenging agent selected from a) a compound having the formula

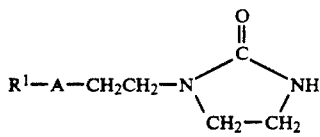

wherein A is selected from O, NH, and NR$^2$; R$^1$ is selected from H, 3-allyloxy-2-hydroxypropyl, methacryloyl, acryloyl and methacryloxyaceto; and R$^2$ is 3-allyloxy-2-hydroxypropyl when R' is 3-allyloxy-2-hydroxypropyl;

b) a compound having the formula R$^3$CH$_2$R$^4$, wherein

R$^3$ and R$^4$ are both —C(O)OR$^5$;

R$^3$ is CH$_3$C(O)— and R$^4$ is —C(O)OR$^5$;

R$^3$ is —CN and R$^4$ is selected from —C(O)NH$_2$ and —C(O)OR$^5$; or

R$^3$ is CH$_c$C(O)— and R$^4$ is —C(O)OCH$_2$CH$_2$OC(O)C(CH$_3$)=CH$_2$; and

R$^5$ is a C$_1$-C$_6$ hydrocarbon radical;

c) a compound having the formula

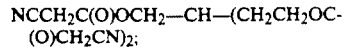
NCCH$_2$C(O)OCH$_2$—CH—(CH$_2$CH$_2$OC(O)CH$_2$CN)$_2$;

d) hydroxylamine;

e) salts of hydroxylamine with an acid, the acid having an acid dissociation constant the negative logarithm of which is no greater than about 5.0; and f) the polymerized residue of a compound having the formula

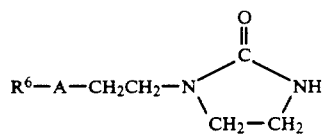

wherein A is selected from O, NH, and NR$^2$; R$^6$ is selected from 3-allyloxy-2-hydroxypropyl, methacryloyl, acryloyl or methacryloxyaceto; and R$^2$ is 3-allyloxy-2-hydroxypropyl when R' is 3-allyloxy-2-hydroxypropyl; and g) the polymerized residue of a compound having the formula

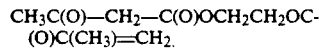
CH$_3$C(O)—CH$_2$—C(O)OCH$_2$CH$_2$OC(O)C(CH$_3$)=CH$_2$.

In those cases in which the formaldehyde scavenging agent is a polymerized residue, the agent can be a residue of the polymer latex.

Preferably, the formaldeyde-scavenging agent is selected from N-hydroxyethylethyleneurea, ethyl acetoacetate, 2,4-pentanedione, esters of 2-cyanoacetate, 2-cyanoacetamide, trimethylolpropane tricyanoacetate, and the polymerized residue of methacryloxyethyleneurea.

In a presently preferred embodiment, the present invention provides a self-crosslinking, low formaldehyde polymer latex composition, which is useful in preparing a variety of end-use products, including texile finishes, nonwoven products, and the like. This composition includes a self-crosslinking polymer latex including N-methylol functional groups, such as acrylic polymer latexes resulting from copolymerization of N-methylolacrylamide or N-methylolmethacrylamide with acrylic monomers. In this embodiment, the polymer latex can be a self-crosslinking polymer latex, or the self-crosslinking polymer latex can be a component of the composition, in addition to a non-self-crosslinking polymer latex. Similarly, where the formaldehyde scavenging agent is a polymerized residue, the residue can be included in the same polymer latex as the self-crosslinking polymer latex having the N-methylol functionality, or can be included in a polymer latex having no N-methylol functionality, or both.

When used, for example, as binders for nonwoven products, compositions of the present invention exhibit low levels of formaldehyde generation during storage, and show low levels of formaldehyde release during drying and cure. Application properties of compositions prepared according to the present invention are comparable to prior art compositions having higher levels of formaldehyde evolution.

The present invention also provides a method of reducing formaldehyde evolution from aqueous polymer latex compositions including formaldehyde, including formaldehyde generated by N-methylol functional groups, such as polymerized residues of N-methylolacrylamide or N-methylolmethacrylamide, the method comprising adding to the composition a formaldehyde-scavenging agent selected from a) a compound having the formula

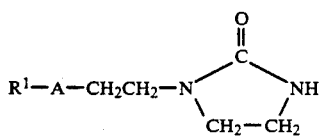

wherein A is selected from O, NH, and $NR^2$; $R^1$ is selected from H, 3-allyloxy-2-hydroxypropyl, methacryloyl, acryloyl and methacryloxyaceto; and $R^2$ is 3-allyloxy-2-hydroxypropyl when $R'$ is 3-allyloxy-2-hydroxypropyl;

b) a compound having the formula $R^3CH_2R^4$, wherein
$R^3$ and $R^4$ are both $-C(O)OR^5$;
$R^3$ is $CH_3C(O)-$ and $R^4$ is $-C(O)OR^5$;
$R^3$ is $-CN$ and $R^4$ is selected from $-C(O)NH_2$ and $-C(O)OR^5$; or
$R^3$ is $CH_3C(O)-$ and $R^4$ is $-C(O)OCH_2CH_2OC(O)C(CH_3)=CH_2$; and $R^5$ is a $C_1-C_6$ hydrocarbon radical;

c) a compound having the formula

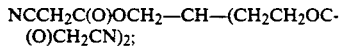

NCCH$_2$C(O)OCH$_2-$CH$-$(CH$_2$CH$_2$OC(O)CH$_2$CN)$_2$;

d) hydroxylamine;

e) salts of hydroxylamine with an acid, the acid having an dissociation constant the negative logarithm of which is no than about 5.0; and f) the polymerized residue of a compound having the formula

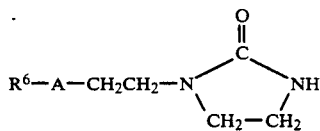

wherein A is selected from O, NH, and $NR^2$; $R^6$ is selected from 3-allyloxy-2-hydroxypropyl, methacryloyl, acryloyl or methacryloxyaceto; and $R^2$ is 3-allyloxy-2-hydroxypropyl when $R'$ is 3-allyloxy-2-hydroxypropyl; and g) the polymerized residue of a compound having the formula

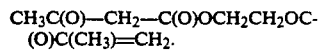

CH$_3$C(O)$-$CH$_2-$C(O)OCH$_2$CH$_2$OC(O)C(CH$_3$)=CH$_2$.

In a presently preferred embodiment, the formaldehyde-scavenging agent is selected from the polymerized residue of methacryloxyethyleneurea, such that the formation of undesirable colored reaction products with the scavenged formaldehyde is avoided. Preferably, the pH of the composition is from about 3 to 6. In addition, it is preferred that the composition include at least about 0.1% formaldehyde-scavenging agent based on polymer soldids, and it is more preferable that the composition includesfrom about 0.5% to 2.0% formaldehyde-scavenging agent based on polymer solids.

DETAILED DESCRIPTION

As used throughout this specification and these claims, "formaldehyde" is synonomous with "free formaldehyde" and does not include the combined formaldehyde present in N-methylol-acrylamide as the methylol moeity. "Free formaldehyde" is defined herein to be that form of formaldehyde which reacts with the Nash reagent (2,4-pentanedione), and includes methylene glycol, methylene glycols oligomers, and methylene glycols acetals with methanol, such as discussed in T. Nash, *Biochem J.* (*London*) 55, 416 (1953).

It is desirable to minimize formaldehyde in polymer latex compositions, such as the formaldehyde associated with self-crosslinking aqueous polymer latexes having N-methylol functionality, while maintaining the application properties of compositions including such polymer latexes.

One way to minimize the level of free formaldehyde generated from self-crosslinking aqueous polymer latex compositions is to avoid the addition of other formaldehyde-containing components sometimes used in preparing polymer latex compositions. Some bacteriocides for preserving aqueous polymer latex compositions include free formaldehyde, and these can sometimes be avoided, and non-formaldehyde preservatives used instead, such as Kathon ® products sold by Rohm and Haas Co. In addition, sodium formaldehyde sulfoxylate ("Formopon ®") is sometimes used as a reducing agent for redox initiator systems used to polymerize the monomers used to prepare aqueous polymer latexes. Formopon contains formaldehyde in a combined form, but is, nevertheless, a potential source for generation of free formaldehyde. Formopon can sometimes be replaced with another, formaldehyde-free reducing agent. Even when these steps have been taken, it is still desirable to minimize generation of formaldehyde from polymerized methylolacrylamide in self-crosslinking aqueous polymer latex compositions. Similarly, sometimes the introduction of small amounts of formaldehyde during preparation of polymer latex compositions cannot be reasonably, avoided. For example, commercial grades of reagents used in the preparation of the polymer latex composition may include a bacteriocide based on formaldehyde, or use of Formopon may be especially desirable in the specific polymerization process employed. In these cases the level of formaldehyde can be minimized by the process of the present invention.

N-methylolacrylamide can be prepared by reacting formaldehyde with an excess of acrylamide resulting at equilibrium in a mixture including N-methylolacrylamide, acrylamide, and a very small level of formaldehyde. As can be seen in FIG. 1, the rate of equilibration is faster under basic conditions than at neutral or acidic conditions. The average equilibrium constant, $K_d$, for the dissociation of N-methylolacrylamide has been found to be 0.052 (pH=10; 25° C.; averaged over results for several ratios of reactants (i.e. [N-methylolacrylamide]=[acrylamide]; [acrylamide]=0; [acrylamide]=0.5[formaldehyde])).

The effect of raising the temperature on $K_d$ has been found to be positive. Thus, the standard enthalpy of dissociation is greater than zero, and raising the temperature shift the equilibrium to greater dissociation of N-methylolacrylamide. FIG. 1 illustrates the rate of approaching equilibrium with 0.20M. N-methylolacryamide as the reactant at 25° C. At a pH of 10, equilibrium (41% conversion) is attained in only seven days, while at a pH of 3, conversion is only 13% after 120 days.

Aqueous polymer latex compositions are multiple phase systems, and are consequently more difficult to analyze than systems containing only dissolved, low molecular weight species. In an analogous way, however, copolymerized N-methyiolacrylamide is in equilibrium in an aqueous composition with dissolved formaldehyde and compolymerized acrylamide.

The N-methylol-functional aqueous polymer latexes used in the compositions of the present invention can be prepared by conventional emulsion polymerization techniques. However, it is preferred that formaldehyde-contributing components be avoided when selecting the polymerization system to be used. In particular, it is desirable to avoid components such as Formopon® (trademark of Rohm and Haas Company, Philadelphia, Pa.) brand sodium formaldehyde sulfoxylate.

N-methylol-functional aqueous polymer latexes are well known for use as binders for non-woven fabrics. For example, U.S. Pat. Nos. 4,745,025, 4,449,978, and 4,481,250 disclose aqueous polymer latexes comprising interpolymers of vinyl acetate, ethylene, and N-methylolacrylamide. N-methylol-functional acrylic polymer latexes are also known for use as nonwoven fabric binders, such as disclosed, for example, in U.S. Pat. No. 3,157,562, and for numerous other textile applications. For example, U.S. Pat. Nos. 4,351,875 and 4,107,120 disclose thermosetting core-shell acrylic latex compositions for textile applications. In these latexes, the shell monomer composition includes a latent crosslinking monomer having N-alkyol functionality, including N-methylol functionality.

Examples of copolymerizable N-methylol-functional ethylenically unsaturated monomers include N-methylolamides of ethylenically unsaturated carboxylic acids having 3-10 carbons, such as N-methyloacrylamide, N-methylolmethacrylamide, N-methylolmaleimide, N-methylolmaleinamic acid, N-methylol-maleinamic acid esters, N-methylolamides of the vinyl aromatic acids such as N-methylol-p-vinylbenzamide, and the like. Often preferred are the N-methylolamides, such as N-methylolacrylamide and N-methylolmethacrylamide, because of their ready availability and low relative cost. Often the N-methylol-functional monomer is employed in a mixture with another copolymerizable monomer. Examples of such mixtures include mixtures of N-methylolacrylamide and acrylamide and mixtures of N-methylolmethacrylamide and methacrylamide. These N-methylol-functional monomers are known to impart self-crosslinking or self-curing characteristics to compositions containing them. The cure may be enhanced by reaction with an active-hydrogen containing resin added to the aqueous polymer latex, such as triazine-formaldehyde and urea-formaldehyde resins, or active hydrogen functionality present in the aqueous polymer latex itself.

As used in this specification and these claims, the term "acrylic" is used in a general sense to describe polymers wherein at least one of the monomers is of the acrylic or methacrylic type, including acrylic and methacrylic acids, esters of acrylic acid or methacrylic acid, amides thereof, and substituted derivatives thereof. "(Meth)acryl-" includes both acrylic and methacrylic derivatives.

Acrylic monomers which can be used to prepare the aqueous polymer latex used in the compositions of the present invention are well known in the art. Examples of such acrylic monomers include alkyl (meth)acrylates such as methyl methacrylate, ethyl acrylate, methyl acrylate, n-butyl acrylate, 2-ethylhexyl acrylate, lauryl acrylate, cyclohexyl acrylate, isopropyl acrylate, isobutyl acrylate, n-amyl acrylate, n-propyl acrylate, ethyl methacrylate, n-propyl methacrylate, n-butyl methacrylate, isopropyl methacrylate, n-octyl methacrylate, dodecyl methacrylate, neopentyl acrylate, n-tetradecyl acrylate, n-tetradecyl methacrylate, isobutyl methacrylate, n-amyl methacrylate, n-hexyl methacrylate, isoamyl methacrylate, cyclopentyl methacrylate, n-decyl methacrylate, and the like; other acrylate and methacrylate esters such as 2-bromoethyl methacrylate, isobornyl methacrylate, phenyl methacrylate, 1-naphthyl methacrylate, benzyl methacrylate, 2-phenylethyl methacrylate, 3-methoxybutyl acrylate, 2-methoxybutyl methacrylate, and 2-n-butoxyethyl methacrylate; active hydrogen-functional monomers including hydroxy-substituted (meth)acrylates such as 2-hydroxyethyl acrylate and 3-hydroxypropyl acrylate; (meth)acrylate including mono- and di-alkylaminoalkyl (meth)acrylates such as dimethylaminoethyl methacrylate, methylaminoethyl methacrylate, and 3-aminopropyl acrylate; sulfonic acids such as sulfoethyl methacrylate, and sulfopropyl acrylate; and phosporic acids such as 2-phosphoethyl (meth)acrylate.

Additional polymerizable unsaturated monomers which can be used to prepare acrylic aqueous polymer latexes for use in the compositions of the present invention include styrene, alpha-methyl styrene, vinyl toluene, acrylonitrile, methacrylonitrile, alpha-chloroacrylonitrile, ethyl acrylonitrile, methyl vinyl ether, isopropyl vinyl ether, n-butyl vinyl ether, isobutyl vinyl ether, tert-butyl vinyl ether, 2-ethylhexyl vinyl ether, 4-hydroxybutyl vinyl ether, dimethylaminoethylvinyl ether, 1,4-butaneglycol divinyl ether, diethyleneglycol divinyl ether, vinyl esters such as vinyl versatate, vinyl propionate, vinyl butyrate, vinyl isobutyrate, vinyl caproate, vinyl 2-ethylhexonate and vinyl decanoate; allyl chloride, methallyl chloride, vinylidene chloride, vinyl chloride, vinyl fluoride, vinylidene fluoride, sodium vinyl sulfonate, butyl vinyl sulfonate, phenyl vinyl sulfone, methyl vinyl sulfone, N-vinyl pyrrolidinone, N-vinyl oxazolidinone, acrolein, acrylamide, methacrylamide, allyl triethoxysilane, allyl tris(trimethylsiloxy) silane, 3-acryloxypropyltrimethoxy silane, and the like; esters of other ethylenically unsaturated carboxylic acids such as dialkyl and trialkyl esters of di- and tri-carboxylic acids such as itaconic acid and the like, including di(2-ethylhexyl) maleate, dimethyl fumarate, dimethyl itaconate, diethyl citraconate, trimethy aconitate, diethyl mesaconate, di(2-ethylhexyl) itaconate and di-(2-chloroethyl) itaconate.

In general, monomers which are reactive with the N-methylol-fuctional monomer, except to the extent such monomers aid in the self-crosslinking function, should be avoided. However, when the methylol-functional monomer also serves as a crosslinking agent for the polymer latex itself, such as used in the shell of the core/shell polymer latexes disclosed in U.S. Pat. No. 4,351,875, monomers reactive with the methylol-functional monomer can be employed. Often, it is desirable to retain sufficient methylol functionality after crosslinking has been achieved for effective enchancement of bonding of the polymer to the substrate on which it is to be used, such as non-woven fibers or the like. Examples of monomers reactive with methylol-functional monomers include acid-functional monomers, including such otherwise commonly employed comonomers as acrylic acid, methacrylic acid, itaconic acid, other active hydrogen-functional monomers, such as 2-hydroxyethyl methacrylate, and the like.

In some cases it may be desirable to include multifunctional monomers, including multi-ethyleneically unsaturated monomers, in the monomer mixture used to prepare aqueous polymer latex. For example, when a core/shell-type polymer latex is to be prepared, such as that disclosed in U.S. Pat. No. 4,351,875 for textile applications, the monomer composition of the core portion may contain one or more monomers which contain at least two addition-polymerizable vinylidene groups and are alpha, beta-ethylenically unsaturated monocarboxylic acid esters of polyhydric alcohols containing 2 to 6 ester groups, such as alkylene glycol diacrylates and dimethacrylates including ethylene glycol diacrylate, 1,3-butylene glycol diacrylate, 1,4-butylene glycol diacrylate, propylene glycol diacrylate, triethylene glycol dimethacrylate, 1,3-glycerol dimethacrylate, 1,1,1-trimethylolpropane dimethacrylate, 1,1,1-trimethylol ethane diacrylate, pentaerythritol trimethacrylate, 1,2,6-hexane triacrylate, sorbitol pentamethacrylate, et al. These monomers are sometimes referred to as "active" crosslinking agents because crosslinking occurs during polymerization of the monomers, as opposed to "latent" crosslinking agents, such as the methylol-functional monomers, which accomplish crosslinking after polymerization has been completed, as when a composition including the latent crosslinking agent has been applied to a substrate such as a nonwoven web as a binder and the composition is being dried and cured at elevated temperature. Other types of multifunctional crosslinking monomers which can be used include methylene bisacrylamide and methylene bismethacrylamide, and divinyl compounds such as divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, diallyl cyanamide, ethylene glycol divinyl ether, diallyl phthalate, divinyl silane, glycerol trivinyl ether, divinyl adipate, allyl methacrylate, allyl acrylate, diallyl maleate, diallyl fumarate and diallyl itaconate.

The polmer latex used in the present invention can be prepared by any technique known in the art, such as suspension polymerization, interfacial polymerization, or emulsion polymerization. However, emulsion polymerization is preferred. Emulsion polymerization techniques for preparing aqueous dispersions of latex polymer particles from ethylenically unsaturated monomers are well known in the polymer arts, and any conventional emulsion technique can be employed. For example, a batch emulsion polymerization technique can be employed to prepare the aqueous polymer latexes used in the present invention. For example, a single shot process in which all reactants are added to the polymerization medium before polymerization is initiated can be used. However, other conventional emulsion polymerization techniques, such as continuous polymerization, multiple stage batch polymerization techniques, and techniques employing gradual addition of reactants to the polymerization medium, can also be used. If desired, a monomer mixture can be prepared and added gradually to the polymerization vessel. The monomer composition within the vessel can be varied during the course of polymerization, such as by altering the composition of the monomer being fed into the vessel. The polymer latex particles can be prepared using a seed polymer emulsion to control the number of particles produced by the emulsion polymerization as is known in the art. The particle size of the polymer latex particles by adjusting the initial surfactant charge as is known in the art. The preparation of polymer latexes is discussed generally in D.C. Blackley, *Emulsion Polymerization* (Wiley, New York, 1975).

Examples of polymerization initiators which can be employed include polymerization initiators of the free radical type, such as water soluble or water dispersable initiators including hydrogen peroxide, cumene peroxide, benzoyl peroxide, caprylyl peroxide, di-tert-butyl peroxide, tert-butyl diperphthalate, tert-butyl perbenzoates, soluble peracetate and percarbonate salts and ammonium or alkali metal (e.g., potassium, sodium or lithium) persulfate. The initiator can be used alone or as the oxidizing component of a redox system, which also includes a reducing component such as L-ascorbic acid or an alkali metal sulfite; more specifically a hydrosulfite, hyposulfite or metabisulfite, such as sodium hydrosulfite, potassium hyposulfite and potassium metabisulfite; or sodium formaldehyde sulfoxylate, although this latter is not preferred because it is another formaldehyde source. The reducing component is frequently referred to as an accelerator. The initiator and accelerator, commonly referred to as catalyst, catalyst system or redox system, can be used in proportion from 0.0001% to 3% each, based on the weight of monomers to be copolymerized. Activators such as chloride and sulfate salts of cobalt, iron, nickel or copper can be used in small amounts. Examples of redox catalyst systems include tert-butyl hydroperoxide/sodium formaldehyde sulfoxylate/Fe(II), and ammonium persulfate/sodium bisulfite/sodium hydrosulfite/Fe(II). The polymerization temperature can be from room temperature to about 90° C., and can be optimized for the catalyst system employed, as is conventional. If desired, the initiator can be dissolved in an aqueous medium and gradually added to the monomer mixture such that the ratio of free radicals from the initiator to monomer is maintained at a low level during the polymerization.

If desired, small amounts of additives such as surfactants, water miscible organic cosolvents, and the like, can be employed in the polymerization medium. Small amounts of surfactants can be added to the aqueous monomer solution to improve monomer compatibility, and to discourage aggregation of latex polymer particles. In general, the growing latex particles are stabilized during emulsion polymerization by one or more surfactants, such as an anionic or nonionic surfactant, as is well-known in the polymerization arts. Many examples of surfactants suitable for emulsion polymerization are given in *McCutchen's Detergents and Emulsifiers* (MC publishing Co., Glen Rock, N.J.), published annually. Other types of stabilizing agents, such as protective colloids, can also be used. Anionic surfactants such as alkyl sulfates, alkylaryl sulfonates, fatty acid soaps, monoglyceride sulfates, sulfoether esters, and sulfoether N-alkyl amides of fatty acids, can be used. Similarly nonionic surfactants can be employed, such as poly(alkeneoxy) alkanols of alkyl phenols and alkyl creosols, and poly(alkeneoxy) derivatives of aliphatic alcohols and other hydroxy compounds, carboxyl compounds, and carboxylic acid amides and sulfonamides. The proportion of surfactant employed depends upon the type of surfactant used and the ultimate use intended for the polymeric composition, and can vary from 0 to about 10% by weight of monomer. For polymerization, the level of surfactants is often from about 0.1 to about 5 percent by weight of monomer. When non-ionic surfactants are used, they can be used at a level of from about 1 to about 5 percent by weight of monomer.

The formaldehyde scavenging agent used in the compositions of the present invention is selected from a) a compound having the formula

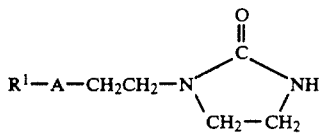

wherein A is selected from O, NH, and $NR^2$; $R^1$ is selected from H, 3-allyloxy-2-hydroxypropyl, methacryloyl, acryloyl and methacryloxyaceto; and $R^2$ is 3-allyloxy-2-hydrodroxypropyl when R' is 3-allyoxy-2-hydroxypropyl;

b) a compound having the formula $R^3CH_2R^4$, wherein
$R^3$ and $R^4$ are both $-C(O)OR^5$;
$R^3$ is $CH_3C(O)-$ and $R^4$ is $-C(O)OR^5$;
$R^3$ is $-CN$ and $R^4$ is selected from $-C(O)NH_2$ and $-C(O)R^5$; or
$R^3$ is $CH_3C(O)-$ and $R^4$ is $-C(O)OCH_2CH_2OC-(O)C(CH_3)=CH_2$; and
$R^5$ is a $C_1-C_6$ hydrocarbon radical;

c) a compound having the formula

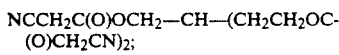
NCCH$_2$C(O)OCH$_2$—CH—(CH$_2$CH$_2$OC-(O)CH$_2$CN)$_2$;

d) hydroxylamine;

e) salts of hydroxylamine with an acid, the acid having an acid dissociation constant the negative logarithm of which is no greater than about 5.0; and f) the polymerized residue of a compound having the formula

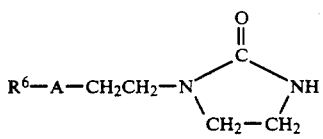

wherein A is selected from O, NH, and $NR^2$; $R^6$ is selected from 3-allyloxy-2-hydroxypropyl, methacryloyl, acryloyl or methacryloxyaceto; and $R^2$ is 3-allyloxy-2-hydroxypropyl when R' is 3-allyloxy-2-hydroxypropyl; and g) the polymerized residue of a compound having the formula

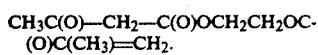
CH$_3$C(O)—CH$_2$—C(O)OCH$_2$CH$_2$OC-(O)C(CH$_3$)=CH$_2$.

Examples of formaldehyde scavenging agents used in the compositions and process of the present invention include N-ethylene derivatives of ethylene urea (i.e. imidazolidin-2-one) such as N-hydroxyethyleneurea, N-aminoethylethyleneurea, N-(3-allyloxy-2-hydroxypropyl)aminoethylethyleneurea, N-methacryloxyethylethyleneurea, N-acryloxyethylethyleneurea, N-methacrylaminoethylethyleneurea, N-acrylaminoethylethylene urea, N-methacryloxyacetoxyethylethyleneurea, N-methacryloxyacetaminoethylethyleneurea, and N-di(3-allyloxy-2-hydroxypropyl)aminoethylethyleneurea. Additional examples of formaldehyde scavenging agents include compounds encompassed by the formula $R^3CH_2R^4$ above, including diones such as 2,4-pentanedione, 2,4-hexanedione, 3,5-heptanedione, 2,4-octanedione, and the like; acetoacetate esters such as ethyl acetoacetate, n-propyl acetoacetate, and n-hexyl acetoacetate; cyano-functional compounds including 2-cyanoacetamide, ethyl 2-cyanoacetate, and n-butyl 2-cyanoacetate; and methacryloxyethyl acetoacetate. Further examples of formaldehyde-scavenging agent compounds include trimethylolpropane tricyanoacetate, hydroxylamine, and salts of hydroxyamine with an acid, the acid having a p$K_a$ no greater than about 5.0, including strong and moderately strong acids, such as hydrochloric acid, trichloroacetic acid, nitric acid, and the like.

In addition to relatively low molecular weight compounds, the formaldehyde scavenging agent can take the form of a residue of an ethylenically unsaturated compound copolymerized with other ethylenically unsaturated compounds to form a polymeric material, such as a polymeric latex dispersed in an aqueous medium. The scavenging agent residue can be present in the same latex as a self-crosslinking polymer latex including N-methylol-functional groups. Alternatively, the N-methylol-functional groups can be included in a first polymer latex and the formaldehyde-scavenging agent can be included as a residue in a second polymer latex, in those cases in which the formaldehyde originates from N-methylol functional groups. The formaldehyde scavenging agent can be the polymerized residue of a compound having the formula

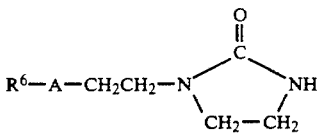

wherein A is selected from O, NH, and $NR^2$; $R^6$ is selected from 3-allyloxy-2-hydroxypropyl, methacryloyl, acryloyl or methacryloxyaceto; and $R^2$ is 3-allyloxy-2-hydroxypropyl when R' is 3-allyloxy-2-hydroxypropyl. Alternatively the formaldehyde scavenging agent can be the polymerized residue of a compound having the formula

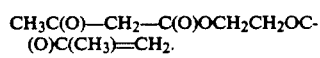
CH$_3$C(O)—CH$_2$—C(O)OCH$_2$CH$_2$OC-(O)C(CH$_3$)=CH$_2$.

Aqueous dispersions of polymer latex including a polymerized residue which functions as the formaldehyde-scavenging agent can be prepared using conventional processes, such as those discussed above for the preparation of aqueous dispersions of polymer latex include N-methylol functional groups.

Preferably, the formaldehyde-scavenging agent is the polymerized residue of methacryloxyethyleneurea so that the formaldehyde-scavenging agent, or its reaction product, does not contribute color to the aqueous polymer latex composition. However, in some applications, the color contributed by formaldehyde-scavenging agents such as 2-cyanoacetate, 2-cyanoamide, and trimethylolpropane tricyanoacetate may be acceptable.

The composition of the present invention can be prepared by post-adding a formaldehyde scavenging agent to the aqueous polymer latex and mixing using conventional techniques, for those formaldehyde scavenging agents which are not covalently bonded to a polymer latex, including ethyl acetoacetate, N-hydroxyethylethyleneurea, 2,4-pentanedione, 2-cyanoacetate, 2-cyanoacetamide, and trimethylolpropane triacyanoacetate.

The amount of formaldehyde scavenging agent employed is preferably at least about 0.1% of the weight of polymer solids, and more preferably from about 0.5% to 2.0%. As a guide, it is desirable to employ the formaldehyde-scavenging in a sufficent amount to provide a two-to-four-fold excess (on an equivalent basis) based on the amount of free formaldehyde that would be expected in the absence of the formaldehyde scavenging agent. Preferably, the pH of the composition is maintained at from about 3 to 6.

Optionally, a small amount of surfactant to enhance the compatibility of the formaldehyde scavenging agent with the aqueous polymer latex can also be added, although there may be sufficient residual surfactant dispersed in the composition, such as surfactant from the polymerization, to serve this function. For example, a small amount, such as from about 0.1 to 2 percent by weight on a solids basis of a nonionic surfactant, such as Triton ® X-165 surfactant (an octylphenoxy poly(ethoxy) ethanol HLB 15.8) or Igepal ® CO-880 surfactant (a nonylphenoxy polyethyleneoxy ethanol, HLB 17.2) can be used.

Small amounts of a catalyst for the self-crosslinking reaction can also be included in the composition, as is conventional. For example, small amounts of a mineral acid, such as hydrochloric acid, or organic acids, such as oxalic acid, or acid salts, such as ammonium chloride, can be used, as is known in the art. The amount of catalyst is often from about 0.5 to 2 percent by weight of polymer latex solids.

When the N-methylol-functionality is provided by copolymerization of N-methylolacrylamide, it is often preferred to adjust the aqueous composition containing the N-methylol functionality to a pH which maximizes the stability of the N-methylol functional group, such as a pH of about 5.6. While more acidic conditions (such as a pH of about 2.9) may initially promote a greater reduction in the free formaldehyde content when a formaldehyde scavenging agent is added, maintaining the pH at a higher level may tend to reduce the dissociation rate of the N-methylol functional group to formaldehyde, and result in a lower ambient level of free formaldyde in compositions which must be stored or transported before use.

The aqueous polymer latex compositions of the present invention can be used in a variety of applications, depending on the properties, such as the glass transition temperature and functionality, of the self-crosslinking aqueous polymer latex used. For example, compositions of the present invention can be used as binders for nonwoven webs, such as those used in manufacturing disposable diapers, disposable tissues, cleaning cloths, asphalt shingles, and other products The use of self-crosslinking aqueous polymer latexes for nonwoven applications is disclosed, for example, in U.S. Pat. No. 4,745,025. A variety of polymer latexes have been tailored for specific application properties. For example, specific polymer latexes have been adapted for use as binders with specific fibers, to provide a desired hand in the finished nonwoven fabric, to provide a desired level of water repellency, to meet desired levels of colorfastness, and to meet specific drying and curing conditions.

If desired, depending on the application, other components can be included in the self-crosslinking polymer latex composition, such as small amounts of defoaming agents; preservatives for organic components such as fungicides and bacteriostats (although formaldehyde itself is obviously to be avoided); uv stabilizers; colorants such as colored pigments and dyes; thickeners such as polyelectrolyte and cellulosic thickener and the like; rheology control agents such as associative thickers and the like; thermosensitizing agents for promoting coagulation of the polymer latex at a predetermined temperature below the internal web temperature during nonwoven binder drying; cosolvents; fluorescent whiting agents; additional water to adjust the solids level; and the like.

When used as a binder for nonwoven fibers, many different types of fibers may be bonded using the compositions of the present invention. For example, natural cellulose fibers (i.e. those containing chiefly $C_6H_{10}O_5$ units) can be bonded, such as natural cellulose fibers derived from wood pulp, cotton and hemp, as well as synthetic cellulose fibers, such as rayon, artificial fibers derived from natural materials, such as cellulose acetate, and synthetic fibers, such as nylons, polyesters, polyethylene, polypropylene and other polyolefins, acrylics, polyurethane, and polyvinyl chloride, as the like, as well as mixtures of natural and synthetic fibers. Typically, the fibers are deposited or arranged in a web by conventional means, such as by carding, air-layering, wet-layering, and the like. Multiple webs can be formed and superposed to provide a laminated structure which can be subsequently bonded. The web can be impregnated all over with binder, printed with binder to form a binder pattern, such as intermittent or continuous lines, or the like, as is conventional in the art. Other types of application methods, such as pad-mangle application, spraying, and foam application, can also be used. The amount of binder which is to be applied to the web should usually be sufficient to provide a self-sustaining web when cured, but depends on the ultimate application of the non-woven material. For example, the amount of binder, calculated on a total solids basis, can be from about 5 percent to over 100 percent by weight of the initial fiber web. After the web has been treated with the binder, the binder is dried and cured, such as by passing the web treated with the uncured binder through a first oven at a first temperature (e.g. about 65°–95° C. for about 5 to 10 minutes) on a continuous belt to evaporate substantially all the water of the aqueous polymer latex composition and form a film enveloping the fibers, and then through a second oven at a second temperature (e.g. about 150°–190° C. for about 2 to 7 minutes) to cure the methylol-functional polymer. The optimum drying and curing regime will depend on the amount of binder employed, the nature of the oven used and its operating parameters (e.g. air-flow rate and heating capacity), the thickness of the web, the end-use application for the cured nonwoven web, and the like.

In the following examples, free formaldehyde is determined using the Nash reagent. The Nash reagent is a solution containing 0.02M acetylacetone, 0.05M acetic acid, and 2M ammonium acetate and has a pH of 6.6. Under the conditions of the assay method formaldehyde reacts with the reagent to produce 3,5-diactyl-1,4-dihydrolutidine (Hantsch reaction) in a highly specific reaction wherein the residue of the formaldehyde is found at C-4 of the lutidine ring. The lutidine is yellow and has a maximum absorption at 412 nm with an extinction coefficient of about 8000. In these examples, the effect of extended long term storage was simulated by accelerated heat-aging at 50° C. Unless otherwise indicated all temperatures are reported in degrees Celsius; and all percentages are by weight of total polymer solids.

In the examples which follow, the following abbreviations are employed in describing the monomer composition of aqueous polymer latexes:

| | |
|---|---|
| EA | ethyl acrylate |
| MMA | methyl methacrylate |
| MAA | methacrylic acid |
| HEMA | 2-hydroxyethyl methacrylate |
| MEU | methacryloxyethylethyleneurea |
| NEAM | equimolar mix of N-methylolacrylamide and acrylamide |

Thus, an aqueous polymer latex described as having a monomer composition of "52 EA/46 MMA/2 NEAM" would have been prepared from a monomer mixture including 52 percent by weight of total monomer solids of ethyl acrylate, 46 percent by weight methyl methacrylate and 2 percent by weight of an equimolar mix of N-methylolacrylamide and acrylamide.

In validating this experimental method it was noted that ammonium nitrate acid catalyst had little, if any, effect on the amount of formaldehyde released during drying and curing of an aqueous polymer latex including N-methylolacrylamide residues, and that most formaldehyde was released during the drying step.

The following examples are illustrative of the process and composition of the present invention and will be useful to one of ordinary skill in the art in practicing the invention. However, the invention is in no way limited by these examples.

EXAMPLE 1

An aqueous polymer latex (Latex A) having 47 percent by weight total solids and having the monomer composition 52 EA/43 MMA/5 NEAM was prepared by a conventional gradual addition, thermal process, and found to have an initial formaldehyde concentration of 250 ppm. Hydroxylamine was added to give 4.5 moles of hydroxylamine per mole of formaldehyde, and the pH of the resulting aqueous polymer latex composition was adjusted to 3, 5, or 8. As can be seen in Table I, the free formaldehyde was measured after storing samples of each at room temperature for six days and after an additional five days at 50° C. The scavenging efficiency of the added hydroxylamine was calculated on a weight basis for the room temperature samples, and is also given in Table I. It can be seen that the hydroxylamine is a highly efficient formaldehyde scavenger under room temperature conditions, and remains so under the elevated temperature conditions, especially under slightly acidic conditions (pH=5). Hydroxylamine reduced the formaldehyde content from 250 to about 29 ppm at room temperature. Even after five days heat-aging at 50° C., significant formaldehyde-scavenging ability was retained, especially under mildly acidic conditions.

Table I also reports the results of parallel evaluation of urea and ethyleneurea as formaldehyde scavengers, Comparative Examples 1 and 2 respectively. Urea has a well-known propensity for reaction with formaldehyde. However, the results in Table I show it to be a poor scavenger for free formaldehyde. Ethyleneurea appeared to have reacted efficiently with formaldehyde initially under acidic conditions (pH=3, pH=5), but showed lower initial efficiency than hydroxylamine under basic conditions (pH =8). On aging at 50° C, the formaldehyde content built up substantially in the alkaline aqueous composition.

TABLE I

| Example | Scavenger | pH | Form.[1] | Efficiency[2] | Form.[3] |
|---|---|---|---|---|---|
| 1 | hydroxyl-amine | 3 | 29 | 88 | 158 |
| | | 5 | 29 | 88 | 63 |
| | | 8 | 26 | 90 | 105 |
| Comp. 1 | urea | 3 | 75 | 70 | 322 |
| | | 5 | 125 | 50 | 121 |
| | | 8 | 118 | 53 | 224 |
| Comp. 2 | ethylene-urea | 3 | 17 | 93 | 18 |
| | | 5 | 11 | 96 | 15 |
| | | 8 | 77 | 69 | 175 |

[1] Free formaldehyde, ppm (based on total latex weight, including water and polymer solids), after six days at room temperature.
[2] Scavenging efficiency, percent of weight of initial free formaldehyde scavenged after six days at room temperature.
[3] Free fomaldehyde, ppm (based on total latex weight), after an additional five days at elevated (50° C.) temperature.

EXAMPLES 2-11

An aqueous polymer latex (Latex B) having total solids of 47 percent by weight and a monomer composition 55 EA/38 MMA/5 MEAM/2 HEMA was prepared using a conventional gradual addition, thermal process. The initial free formaldehyde concentration of the aqueous polymer latex was determined to be 193 ppm. One sample of the solution was adjusted to a pH of 4, and another sample of the solution was adjusted to a pH of 7, these pHs having been previously determined to be optimum for formaldehyde scavenging by ethyleneurea and by ethyl acetoacetate, respectively. To samples of these varying amounts of ethyleneurea or ethyl acetoacetate were respectively added, to give compositions in which the mole ratios of the scavenger to intial free formaldehyde were 6.3, 4.3, 2.3 and 1.2. The intial free formaldehyde of the compositions and that after nine and twenty-seven days of heat-aging the compostions at 50° C. were determined, as were the initial pH and the pH after twenty-seven days of heat aging. The results of these determinations are reported in Table II for the ethyl acetoacetate scavenger (Examples 2-5) and for the ethyleneurea scavenger (Comparative Examples 2-5). A mole ratio of about 4 to 1 is seen to be optimum for both scavengers, as a lower ratio is less efficient and a higher ratio appears to offer no significant additional efficiency. Ethyl acetoacetate is seen to to be a more efficient scavenger than ethyleneurea. However, the ethyl acetoacetate-scavenged polymer latex compositions are found to be colored upon curing. On the other hand, aqueous polymer latex compositions scavenged with ethyleneurea are not found to be colored on curing. The determination was repeated using trimethylolpropane tricyanoacetate (Examples 6-8) and methyl cyanoacetate (Examples 9-11) as scavenger at mole ratios of 4.3, 2.3 and 1.7, and measuring the free formaldehyde concentration at 20 days rather than 27 days. The results are also reported in Table II, and show either of these compounds as comparable in formaldehyde scavenging efficacy to both the ethyl acetoacetate and the ethyleneurea.

TABLE II

| Example | Scavenger | Mole[1] ratio | Init. pH | Final pH | Formaldehyde[2] Initial | 9 day | 27 days |
|---|---|---|---|---|---|---|---|
| 2 | ethyl acetoacetate | 6.3 | 7.0 | 4.3 | 3 | 4 | 22 |
| 3 | " | 4.3 | 7.0 | 4.1 | 3 | 5 | 24 |
| 4 | " | 2.3 | 7.0 | 4.9 | 4 | 14 | 78 |
| 5 | " | 1.2 | 7.0 | 5.2 | 18 | 54 | 144 |
| 6 | trimethylol-propane tricyanoacetate | 4.3 | 7.0 | 4.8 | 5 | 8 | 54[3] |
| 7 | trimethylol-propane tricyanoacetate | 2.3 | 7.0 | 5.2 | 7 | 19 | 54[3] |
| 8 | trimethylol-propane tricyanoacetate | 1.7 | 7.0 | 5.4 | 39 | 72 | 129[3] |
| 9 | methyl cyanoacetate | 4.3 | 7.0 | 3.8 | 3 | 13 | 29[3] |
| 10 | " | 2.3 | 7.0 | 5.2 | 4 | 19 | 49[3] |
| 11 | " | 1.7 | 7.0 | 4.8 | 15 | 77 | 143[3] |
| Comp. 2 | ethyleneurea | 6.3 | 4.4 | 4.6 | 6 | 12 | 13 |
| Comp. 3 | | 4.3 | 4.4 | 4.5 | 13 | 16 | 22 |
| Comp. 4 | | 2.3 | 4.4 | 4.5 | 24 | 24 | 54 |
| Comp. 5 | | 1.2 | 4.4 | 5.5 | 48 | 97 | 164 |

[1]Mole ratio of scavenger to free formaldehyde in aqueous polymer latex before scavenger addition.
[2]Ppm (based on total latex weight, including water and polymer solids).
[3]20 days.

EXAMPLES 12-14

Samples of Latex B, having an initial free formaldehyde concentration of 193 ppm, were adjusted to pHs of 3, 5 and 7, and sufficient formaldehyde scavenger to give a scavenger to initial free formaldehyde mole ratio of 4.3, for a water control and for N-hydroxyethylethyleneurea and three comparative scavengers, ethyleneurea, and two 4,5-substituted ethyleneurea derivatives, 4,5-dihydroxyethyleneurea, and 4,5-dimethoxyethyleneurea. Free formaldehyde level was determined after five days at 25° C. and after an additional seven days at 50° C., the results being reported in Table III.

The efficiency of N-hydroxyethylethyleneurea is suprising, in view of the fact that it contains only one-half the formaldehyde-reactive fuctionality of ethyleneurea. Ethyleneurea itself again shows good, efficient scavenging; however, poor scavenging is seen with 4,5-dihyroxyethyleneurea at pHs less than 7, and with 4,5-dimethoxyethyleneurea at a pH of 7.

TABLE III

| Example | Scavenger | pH | Formaldehyde, ppm[2] 5 days, 25° C. | 7 days, 50° C. |
|---|---|---|---|---|
| 12 | N-hydroxyethyl-ethyleneurea | 3 | 28 | 90 |
| 13 | | 5 | 45 | 44 |
| 14 | | 7 | 169 | 78 |
| C. 7[1] | ethyleneurea | 3 | 14 | 23 |
| C. 8 | | 5 | 31 | 13 |
| C. 9 | | 7 | 145 | 36 |
| C. 10 | 4,5-dihydroxy-ethyleneurea | 3 | 134 | 125 |
| C. 11 | | 5 | 152 | 111 |
| C. 12 | | 7 | 108 | 135 |
| C. 13 | 4,5-dimethoxy-ethyleneurea | 3 | 147 | 142 |
| C. 14 | | 5 | 170 | 123 |
| C. 15 | | 7 | 106 | 141 |
| C. 16 | water | 3 | 218 | 423 |
| C. 17 | | 5 | 194 | 293 |
| C. 18 | | 7 | 166 | 280 |

[1]Comparative examples.
[2]Ppm, based on total latex weight, including water and polymer solids.

EXAMPLE 15

The release of formaldehyde from aqueous polymer latex compositions under drying and cure conditions was carried out as described above for ethyleneurea and ethyl acetoacetate scavengers, the results being reported in Table IV. To verify the test method, the formaldehyde released by Latex C, a nominally "formaldehyde-free" aqueous polymer latex having the monomer composition 55 EA/43 MMA/2 MAA and a total solids content of 47 percent was measured by the test method (Comparative Example 19) and found to be 55 ppm. This polymer latex was known to contain 60 ppm on a solids basis The same polymer latex was spiked with 426 ppm of formaldehyde (Comparative Example 20) and found to release 475 ppm. Latex B, known to contain 420 ppm free formaldehyde, was found to release 724 ppm formaldehyde (Comparative Example 21). When one percent w/w ammonium nitrate catalyst was added (Comparative Example 22), the same Latex B was found to release 770 ppm formaldehyde, indicating that the catalyst had little, if any effect on the amount of formaldehyde released.

Duplicate determinations were made (Comparative Examples 23 and 24) of the amount of formaldehyde released (930 ppm and 844 ppm) from Latex A and compared with that released from a composition of Latex A and 0.5 percent by weight ethyl acetoacetate (Example 15), namely only 122 ppm formaldehyde. In this case, the free formaldehyde level was reduced from 715 ppm to 8 ppm upon addition of the ethyl acetoacetate scavenger.

Another batch of Latex A with 846 ppm free formaldehyde released 1100-1200 ppm in duplicate determinations (Comparative Examples 25 and 26), but upon scavenging with 0.5% w/w ethyleneurea, this batch of Latex A released only 114 ppm formaldehyde (Comparative Example 27).

When the drying cycle was omitted and the samples heated directly to a cure temperature of 150° C. for two hours, the amount of formaldehyde released increased significantly, from 1100-1200 ppm (Comparative Examples 25 and 26) to 1770 ppm (Comparative Example 28) for unscavenged latex compositions and from 114 ppm (Comparative Example 27) to 360-600 ppm (Comparative Examples 29-30). The lower level of released formaldehyde, 360 ppm, arose from an experiment in which the weight of aqueous polymer latex composition was only 20% of the usual weight (Comparative Example 30). This result suggests that the amount of formaldehyde released is dependent on the contact time with water. A longer contact time, as in a larger sample, would appear to result in a greater amount of released formaldehyde.

TABLE IV

| Example | Latex | Form. Initial | Formaldehyde evolved, ppm[9] | | |
|---|---|---|---|---|---|
| | | | Drying[1] | Curing[2] | Total |
| C. 19[3] | C[4] | 60 | — | — | 55 |
| C. 20 | C[5] | 486 | 441 | 31 | 475 |
| C. 21 | B | 420 | 528 | 176 | 724 |
| C. 22 | B[6] | 420 | 685 | 80 | 770 |
| C. 23 | A | 715 | 620 | 310 | 930 |
| C. 24 | A | 715 | 820 | 24 | 844 |
| 15 | A[7] | 8 | 19 | 90 | 122 |
| C. 25 | A | 846 | 920 | 170 | 1130 |
| C. 26[8] | A | 846 | 960 | 200 | 1210 |
| C. 27 | A | 22 | 37 | 70 | 114 |
| C. 28 | A | 846 | Omitted | 1770 | 1770 |
| C. 29 | A | 22 | Omitted | 600 | 600 |
| C. 30[8] | A | 22 | Omitted | 340 | 340 |

[1]Formaldehyde evolved during drying for 180 minutes at 80° C., ppm.
[2]Formaldehyde evolved during curing for 100 minutes at 150° C., ppm.
[3]Comparative Example.
[4]Latex C, 55 EA/43 MMA/2 MAA
[5]Latex C, spiked with 200 ppm formaldehyde
[6]Latex B with one percent w/w ammonium nitrate.
[7]Latex A with one-half percent w/w ethyl acetoacetate
[8]Sample weight was only about 20% by weight of the normal 10–15 g.
[9]Ppm, based on weight of latex solids.

EXAMPLES 16–21

Aqueous polymer latexes (Latex D and Latex E) having total solids of 48 and 48 percent by weight respectively, and monomer compositions 56.6 EA/39 MMA/2.3 NEAM/2 MEU (Latex D) and 56.6 EA/39 MMA/2.3 NEAM/1 MEU (latex E) were prepared using a conventional gradual addition, thermal process. The pH of samples of these latexes was adjusted as shown in Table V, and the formaldehyde concentration measured after three and six days at room temperature and after seven and twenty days at 50° C. As can be seen in the results reported in Table V, Latex D with 2% MEU, was found to contain less than 10 ppm free formaldehyde and upon heat-aging the latex at pH 5 there was little change in the formaldehyde concentration Latex E, with 1% MEU, appeared to be less efficient (20 ppm v. 6 ppm) but did not increase very much in formaldehyde concentration during heat-aging. Release of formaldehyde from Latex D was also evaluated, and it was found that Latex D, which initially had a free formaldehyde concentration of 6 ppm, was found to evolve 30 ppm of formaldehyde during drying and 17 ppm of formaldehyde during cure, for a total of 55 ppm formaldehyde. MEU is therefore formaldehyde-scavenging functionality which has been incorporated into the polymer latex itself, and which effectively reduces formaldehyde emissions.

TABLE V

| Example | Latex | pH | Formaldehyde, ppm[5] | | | |
|---|---|---|---|---|---|---|
| | | | 3 d, rt | 6 d, rt[2] | 7 d, 50°[3] | 20 d, 50°[4] |
| 16 | D | 3 | 7 | 6 | | |
| 17 | D | 5 | 6 | 6 | 6 | 6 |
| 18 | D | 7 | 7 | 7 | | |
| 19 | D | 8.5 | 9 | 32 | | |
| 20 | D | 2.2 | | 16 | 95 | 200 |
| 21 | D | 5 | | 18 | 25 | 38 |

[1]Free formaldehyde after 3 days at room temperature.
[2]Free formaldehyde after 6 days at room temperature.
[3]Free formaldehyde after 7 days at 50° C.
[4]Free formaldehyde after 20 days at 50° C.
[5]Ppm, based on total latex weight, including water and solids.

EXAMPLES 22–30

Polymer latex emulsions evaluated in Examples 2–10 and Comparative Examples 2–4 were also tested as binders for nonwovens articles. A spun-bonded needle-punched polyester web was saturated by placing it in a bath of the emulsion adjusted to twelve percent solids. Pickup of the wet binder was found to be 200% of the weight of the dry web. The web was maintained at 177° C. for five minutes to dry and cure the binder. An Intellect 500 tensile tester was used to obtain the room temperature tensile strength of the cured web. A one inch by four inch sample (oriented with the long axis parallel to the direction of extension) of the web was tested with a crosshead speed of two inches per minute and with a two inch gap to give the load in pounds and the elongation. An Instron test machine with an environmental chamber maintained at 180° C. and a one minute dwell time was used to test a one and one-half by seven inch section of the web at a crosshead speed of four inches per minute and with gap of four inches. The elongation was read at the specified load of 11 and 18 psi. Low values are preferred for the 180° C. elongation. The results are reported in Table VI, and show that formaldehyde scavengers employed in the present invention, namely ethyl acetoacetate (Examples 22–24), trimethylolpropane tricyanoacetate (Examples 25–27), and methyl cyanoacetate (Examples 28–30) provide binders for non-woven articles which are comparable to binders employing ethyleneurea (Comparative Examples 31–33) as a formaldehyde scavenger or which do not include a formaldehyde scavenger (Comparative Examples 34–35).

TABLE VI

| Example | Scavenger | Mole[1] ratio | Room Temperature | | 18° C. Elongation | |
|---|---|---|---|---|---|---|
| | | | Tensile Strength | Elongation | @ 11 lbs | @ 18 lbs |
| 22 | ethyl acetoacetate | 6.3 | 46.6 lbs | 52.4% | 8.4% | 21.5% |
| 23 | " | 4.3 | 39.5 | 50.4 | 6.8 | 17.7 |
| 24 | " | 2.3 | 43.8 | 48.8 | 6.0 | 15.9 |
| 25 | trimethylol-propane tricyanoacetate | 4.3 | 42.0 | 49.8 | 7.5 | 19.8 |
| 26 | trimethylol-propane tricyanoacetate | 2.3 | 43.5 | 51.2 | 8.9 | 22.1 |
| 27 | trimethylol-propane tricyanoacetate | 1.7 | 41.9 | 48.1 | 6.6 | 16.7 |
| 28 | methyl cyanoacetate | 4.3 | 39.7 | 48.9 | 9.4 | 23.1 |
| 29 | " | 2.3 | 43.9 | 53.6 | 7.9 | 20.4 |
| 30 | " | 1.7 | 42.7 | 50.7 | 7.7 | 16.9 |
| Comp. 31 | ethyleneurea | 6.3 | 43.0 | 52.7 | 7.4 | 18.9 |
| Comp. 32 | | 4.3 | 44.8 | 50.3 | 9.5 | 22.9 |
| Comp. 33 | | 2.3 | 41.9 | 50.3 | 7.1 | 17.5 |
| Comp. 34 | None[2] | — | 40.3 | 48.6 | 6.3 | 15.2 |

TABLE VI-continued

| | | Room Temperature | | 18° C. | |
|---|---|---|---|---|---|
| | Mole[1] | Tensile | Elon- | Elongation | |
| Example Scavenger | ratio | Strength | gation | @ 11 lbs | @ 18 lbs |
| Comp. 35 None[2] | — | 45.3 | 53.2 | 8.3 | 20.5 |

[1]Mole ratio of scavenger to free formaldehyde in aqueous polymer latex before scavenger addition.
[2]Latex B.

Various modifications can be made in the details of the various embodiments of the process and composition of the present invention, all within the spirit and scope to the invention as defined in the appended claims.

We claim:

1. A low-formaldehyde polymer latex composition, the composition comprising:
   at leat one polymer latex, and
   at least one formaldehyde-scavenging agent selected from
   a) a compound having the formula

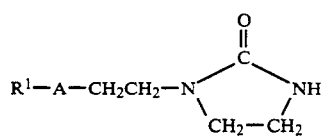

wherein A is selected from O, NH, and NR$^2$; R$^1$ is selected from H, 3-allyloxy-2-hydroxypropyl, methacryloyl, acryloyl and methacryloxyaceto; and R$^2$ is 3-allyloxy-2-hydroxypropyl when R' is 3-allyoxy-2-hydroxypropyl;
   b) a compound having the formula R$^3$CH$_2$R$^4$, wherein
      R$^3$ and R$^4$ are both —C(O)OR$^5$;
      R$^3$ is CH$_3$C(O)— and R$^4$ is —C(O)OR$^5$;
      R$^3$ is —CN and R$^4$ is selected from —C(O)NH$_2$ and —C(O)OR$^5$; or
      R$^3$ is CH$_3$C(O)— and R$^4$ is —C(O)OCH$_2$CH$_2$OC-(O)C(CH$_3$)=CH$_2$; and
      R$^5$ is a C$_1$-C$_6$ hydrocarbon radical;
   c) a compound having the formula

NCCH$_2$C(O)OCH$_2$—CH—(CH$_2$CH$_2$OC-(O)CH$_2$CN)$_2$;

d) hydroxylamine;
   e) salts of hydroxylamine with an acid, the acid having an acid dissociation constant the negative logarithm of which is no greater than about 5.0; and
   f) the polymerized residue of a compound having the formula

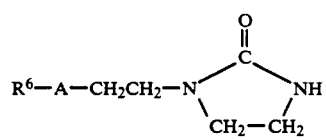

wherein A is selected from O, NH, and NR$^2$; R$^6$ is selected from 3-allyloxy-2-hydroxypropyl, methacryloyl, acryloyl or methacryloxyaceto; and R$^2$ is 3-allyloxy-2-hydroxypropyl when R' is 3-allyoxy-2-hydroxypropyl; and
   g) the polymerized residue of a compound having the formula

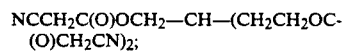
   CH$_3$C(O)—CH$_2$—C(O)OCH$_2$CH$_2$OC-(O)C(CH$_3$)=CH$_2$.

2. A composition according to claim 1 wherein the formaldehyde-scavenging agent is selected from N-hydroxyethylethyelene-urea, ethyl acetoacetate, 2,4-pentanedione, 2-cyanoacetate, 2-cyanoacetamide, trimethylolpropane tricyanoacetate, and the polymerized residue of methacryloxyethylethyleneurea.

3. A composition according to claim 2 wherein the formaldehyde-scavenging agent is the polymerized residue of methacryloxyethyleneurea.

4. A composition according to claim 2 wherein the formaldehyde-scavenging agent is ethyl acetoacetate.

5. A composition according to claim 1 wherein the pH of the composition is from about 3 to 6.

6. A composition according to claim 5 wherein the composition includes at least about 0.5% formaldehyde scavenging agent based on polymer solids.

7. A composition according to claim 6 wherein the composition includes at least about 0.1% formaldehyde scavenging agent based on polymer solids.

8. A composition according to claim 1 wherein the composition includes a self-crosslinking polymer latex including N-methylol fuctional groups.

9. A composition according to claim 8 wherein the formaldehyde-scavenging agent is the polymerized residue of methacryloxyethyleneurea, the self-crosslinking polymer latex including the polymerized residue of methacryloxyethyleneurea.

10. A method of reducing formaldehyde evolution from aqueous polymer latex compositions, the method comprising adding to the composition a formaldehyde-scavenging agent selected from
   a) a compound having the formula

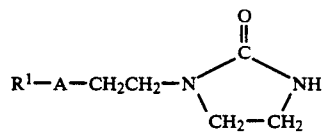

wherein A is selected from O, NH, and NR$^2$; R$^1$ is selected from H, 3-allyloxy-2-hydroxypropyl, methacryloyl, acryloyl and methacryloxyaceto; and R$^2$ is 3-allyloxy-2-hydroxypropyl when R' is 3-allyloxy-2-hydroxypropyl;
   b) a compound having the formula R$^3$CH$_2$R$^4$, wherein
      R$^3$ and R$^4$ are both —C(O)OR$^5$;
      R$^3$ is CH$_3$C(O)— and R$^4$ is —C(O)OR$^5$;
      R$^3$ is —CN and R$^4$ is selected from —C(O)NH$_2$ and —C(O)OR$^5$; or
      R$^3$ is CH$_3$C(O)— and R$^4$ is —C(O)OCH$_2$CH$_2$OC-(O)C(CH$_3$)=CH$_2$; and
      5 is a C$_1$-C$_6$ hydrocarbon radical;
   c) a compound having the formula

NCCH₂C(O)OCH₂—CH—(CH₂CH₂OC-
(O)CH₂CN)₂;

d) hydroxylamine;

e) salts of hydroxylamine with an acid, the acid having an acid dissociation constant the negative logarithm of which is no greater than about 5.0; and f) the polymerized residue of a compound having the formula

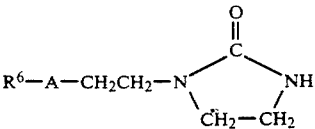

wherein A is selected from O, NH, and NR²; R⁶ is selected from 3-allyloxy-2-hydroxypropyl, methacryloyl, acryloyl or methacryloxyaceto; and R² is 3-allyloxy-2-hydroxypropyl when R' is 3-allyloxy-2-hydroxypropyl; and g) the polymerized residue of a compound having the formula

CH₃C(O)—CH₂—C(O)OCH₂CH₂OC-
(O)C(CH₃)=CH₂.

* * * * *